March 14, 1939.  G. R. DEMPSTER  2,150,821
TRANSPORTING AND DUMPING VEHICLE
Filed Nov. 20, 1937  2 Sheets-Sheet 1
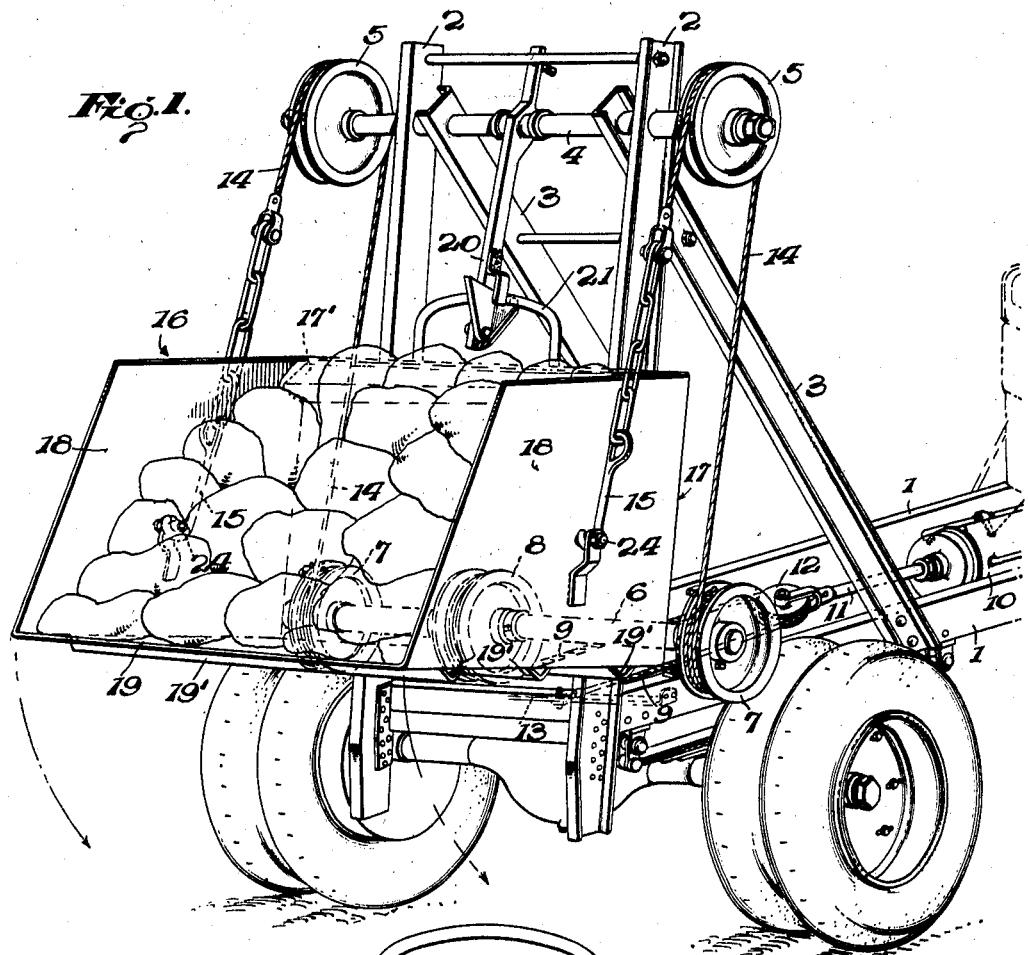
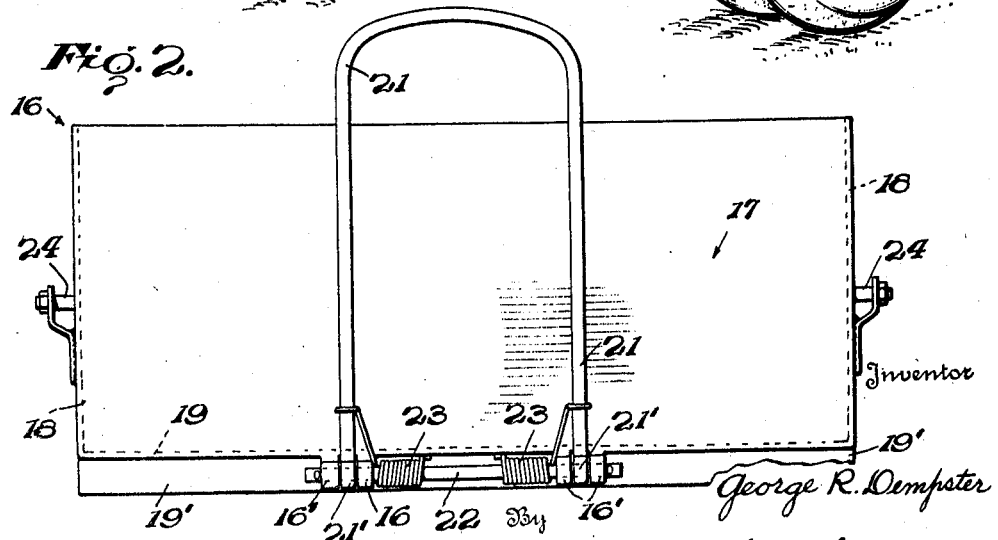

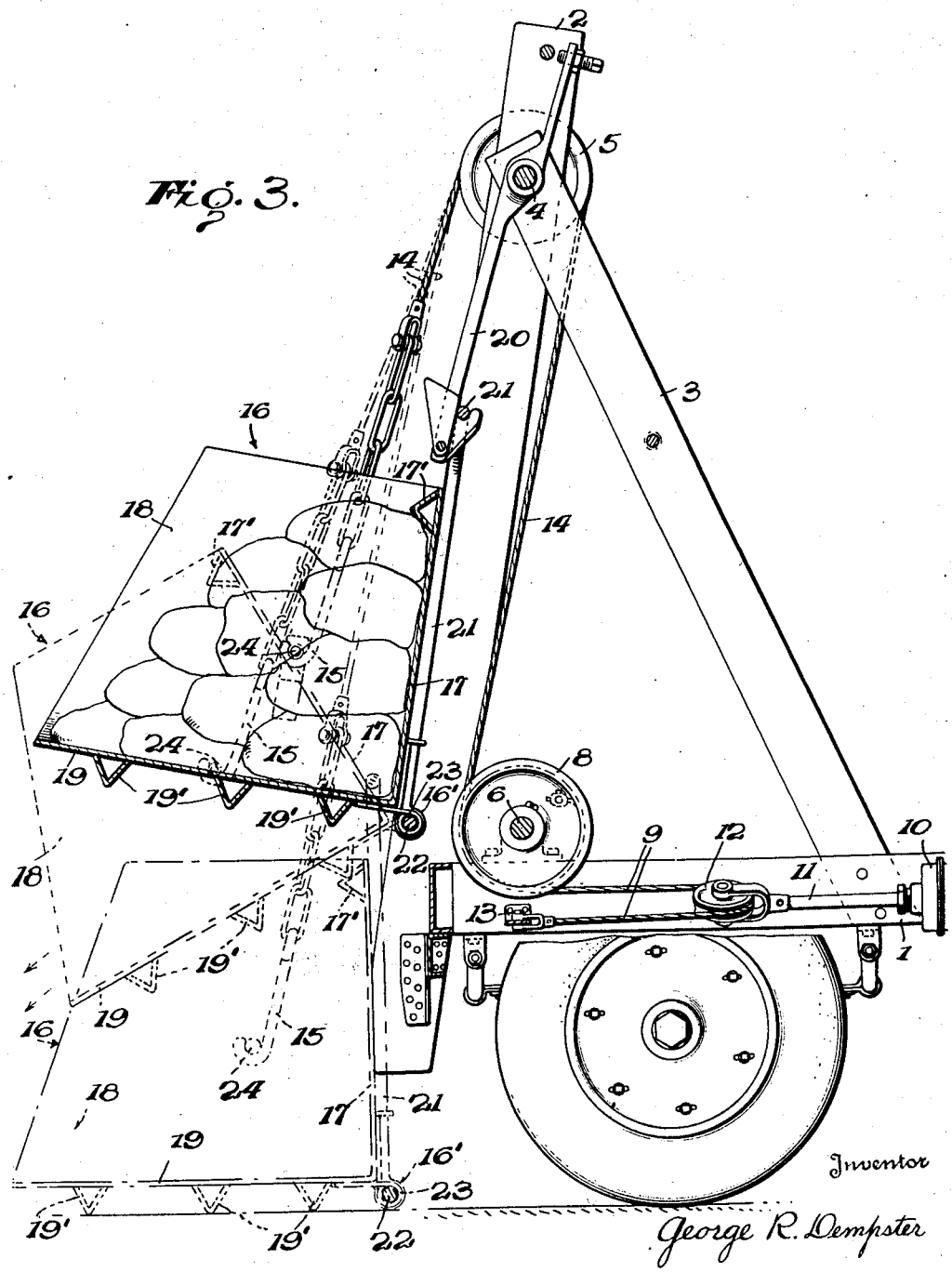

Patented Mar. 14, 1939

2,150,821

UNITED STATES PATENT OFFICE 2,150,821

TRANSPORTING AND DUMPING VEHICLE

George R. Dempster, Knoxville, Tenn.

Application November 20, 1937, Serial No. 175,714

3 Claims. (Cl. 214—75)

This invention relates to transporting and dumping vehicles provided with a container for the load to be transported. In many cases it is desirable to supply a number of containers to the end that while one container is being transported to the point of delivery, others may be filled and ready for transportation when the carrying vehicle returns. With this end in view it is common in the art to mount on a vehicle, such as a truck, a track or way provided with suitable means for raising and lowering the container, for dumping the transporting container at the point of delivery, and for setting the container down and releasing it from transporting means at the point where it is to be loaded. In many cases, such as in quarries, the material to be loaded into the container is of very substantial weight, and much labor is required to lift the stone and place the same in the container. In many cases the container has a depth of approximately three feet, and the labor required to lift and place the load in the container adds to the time and cost of loading the container.

One of the objects of the present invention is to provide a transporting vehicle of the usual or any suitable type, and supply the same with a container which can be readily loaded at a decreased expense, in time and labor, and which can be readily dumped by the operator of the vehicle, the container being automatically returned to transporting position after the dumping operation.

The invention may be embodied in a variety of forms, one of which for the purpose of illustrating the invention is shown in the accompanying drawings, in which Fig. 1 is a perspective view of the rear of the vehicle, with the loaded container in transporting position;

Fig. 2 is a rear elevation of the container; and

Fig. 3 is a side elevation in section, showing the container in full lines in transporting position, in dotted lines in dumping position and in dot and dash lines in the position which it occupies when resting on the ground.

Referring to the drawings, in which like reference numerals indicate like parts throughout the several views, 1—1 are side rails on any suitable vehicle, such as a truck, and 2—2 are bars, preferably made of angle iron, extending upward from the rear end of the rails 1—1, and as here shown, in a slightly inclined direction. 3—3 are brace bars, also preferably of angle iron, secured at their lower ends to the rails 1 and extending upward to near the upper portion of the bars 2—2.

A rod 4 is passed through the upper ends of the bars 2—2 and 3—3 with the ends of the rod projecting outward beyond the bars 2—2, and on said projecting ends of the rod 4 are mounted sheaves 5—5. Mounted in suitable bearings near the base of the track or way, composed of the bars 2—2, is a shaft 6 extending across the vehicle and having drums 7—7 secured to the outer ends thereof in a substantially vertical position under the sheaves 5—5. On the shaft 6 there is also a drum 8 approximately midway between the rails 2—2 of the track or way, around which drum there is wound a cable 9 in operative relation with a power device, whereby the shaft 6 may be rotated. As here shown, the power device is in the form of a cylinder 10 in which plays a piston rod 11 carrying a sheave 12, around which the cable 9 passes from a fixed point 13 to the drum 8. Cables 14—14 are secured to the drums 7—7, passed upward over the sheaves 5 and are provided with any suitable means, here shown as hooks 15—15, for engagement with the container. During the operation of piston rod 11, the shaft 6 is revolved so as to either wind the cable 9 thereon or permit it to be unwound therefrom, to the end that the hooks 15—15 may be raised or lowered as desired. Control of the application of power to the cylinder 10 is effected from the driver's seat.

The construction thus far described is substantially that shown, described and claimed in my copending U. S. application Serial No. 120,993 filed January 16, 1937, now Patent No. 2,121,121, granted June 21, 1938, and while such specific construction is preferable, the present invention is not limited thereto, since any form of vehicle, any suitable track or way, and any suitable means for raising and lowering the container on said track or way are within the purview of the present invention.

Referring now to Fig. 1, 16 is a container preferably made of heavy sheet iron, and has a back wall 17, two end walls 18—18 and a bottom 19, all of which parts as here shown are rigidly connected together. With this construction it will be seen that the container has an open top and an open front. By front, as here used, is meant the side of the container through which the dumping action occurs, without reference to which is the front or back of the vehicle on which it is mounted. Preferably the bottom 19 of the container is reenforced by longitudinally extending ribs 19', and the upper portion of the back wall of the container is reenforced by a longitudinally extending rib 17'. At the rear of the container is provided means whereby it may be supported by a suitable catch 20, when in its elevated position on the track or way during transportation, as clearly shown in Figs. 1 and 3. This element, as here shown, takes the form of a bail 21 which extends from a point closely adjacent to the lower rear edge of the container to a point above the top of the back wall of the container. The bail piece 21 has a rod 22 passing through eyes or openings provided in the lower ends 21'—21' of the bail. To this rod 22 the container is hinged by suitable hinge connections 16', to the end that the container may swing bodily downward around the pin 22 from the position shown in full lines in Fig. 3 to that shown in dotted lines in said figure.

Means are provided whereby, in the downward swinging of the container into dumping position as shown in dotted lines in Fig. 3, power is generated by such downward movement, which power acts, when the load has been dumped from the container, to return the container from the position shown in dotted lines in Fig. 3 to full line position shown in said figure. As here shown, this power means is in the form of a spring or springs 23 wound around the pin or rod 22, one end of which spring is engaged and held by the bail piece 21, while the other end extends under the bottom of the container. The spring or springs 23 are powerful enough to hold the empty container in the full line position shown in Figs. 1 and 3, but are insufficient to prevent the loaded container from turning downward on the pin 22 when the hooks 15—15 or other supporting means are permitted to descend.

Referring now to Figs. 1 and 2, the container is provided at its opposite ends with projecting pins 24—24 which, when the load is to be elevated and supported, are engaged by the hooks 15—15 connected to the cables 14—14. In operation the container is placed upon the ground as shown in dash and dot lines in Fig. 3, and may be readily loaded with any material to be transported, such as heavy stones, without the necessity of lifting the stones over any front wall. When the container is to be transported, whether loaded or not, the hooks 15 are placed in engagement with the pins 24, and the power mechanism operates to elevate the container along the track or way until the bail 21 is automatically engaged by the catch 20, and it is then in position to be transported to the point of delivery. While the catch 20, as here shown, is an automatic catch of special construction, the use of such catch is not essential, since any suitable means well known in the art for engaging and holding the container in elevated position may be employed.

With the parts in the position shown in Fig. 1, the loaded container may be transported to the position of delivery. When this point is reached, the power mechanism is operated to release the power applied through the cables 14, whereupon the container, with its load, turns downward around hinge pin 22 into the position shown in dotted lines in Fig. 3, with the result that the contents of the container are discharged through the open front side thereof. The bail 21 does not participate in this turning movement, but is held by catch 20 in the position shown in Figs. 1 and 3. The result of this is that the downward turning movement of the container places the spring 23 under tension, and as soon as the load is discharged from the container the spring automatically returns the container to the normal full line position shown in Figs. 1 and 3.

When it is desired to place the container on the ground for loading or other purpose, the retaining catch 20 is released and the power mechanism is actuated to permit the hooks 15 and attached container to descend by its own weight along the track or way until the container reaches the ground, that is, in the position shown in dash and dot lines in Fig. 3. Thereupon the hooks 15 are released from the pins 24, and the truck is then free to pick up and transfer another loaded container.

Having thus described the invention, what is claimed is:

1. In a transporting and dumping vehicle, the combination of a track or way, a container having a bottom and end and rear walls and an open front, a hinge pin around which said container turns to dump its contents, a bail connected to said hinge pin and extending above the back wall of the container, a spring in operative engagement with said bail and container whereby said spring is placed under tension when the container turns around said hinge pin in dumping, means for raising and lowering the container with its back wall sliding along said track or way, and a catch engaging and supporting said bail piece when the container is in elevated position.

2. A container having closed bottom and end and rear walls and an open front and top, a pin, means pivotally connecting the container to the pin adjacent the lower rear edge of the container, a bail carried by said pin extending along and above the rear wall of the container and a spring carried by said pin and reacting between the container and the bail and normally holding the bail against the rear wall of the container.

3. In a transporting and dumping vehicle, the combination of a track or way, a container having a bottom and end and rear walls and an open front, the length of the container transverse of the vehicle being greater than the distance between the rails of said track or way, means detachably connected to the end walls of said container for raising and lowering the container with its back wall sliding along said track or way, means on said vehicle for holding said container in elevated position, and a spring put under tension by the dumping action of the container and returning the container to non-dumping position after dumping.

GEORGE R. DEMPSTER.